United States Patent
Burns

(10) Patent No.: US 11,213,025 B1
(45) Date of Patent: Jan. 4, 2022

(54) DEVICE FOR DISPENSING PESTICIDES AND/OR PARASITICIDES TO RODENTS OR OTHER ANIMALS

(71) Applicant: Nathaniel Burns, East Quogue, NY (US)

(72) Inventor: Nathaniel Burns, East Quogue, NY (US)

(*) Notice: Subject to any disclaimer, the term of this patent is extended or adjusted under 35 U.S.C. 154(b) by 204 days.

(21) Appl. No.: 16/403,019

(22) Filed: May 3, 2019

Related U.S. Application Data

(60) Provisional application No. 62/701,113, filed on Jul. 20, 2018, provisional application No. 62/666,739, filed on May 4, 2018.

(51) Int. Cl.
*A01M 25/00* (2006.01)
*A01M 1/20* (2006.01)

(52) U.S. Cl.
CPC ............ *A01M 25/002* (2013.01); *A01M 1/20* (2013.01); *A01M 2200/01* (2013.01)

(58) Field of Classification Search
CPC ......................... A01M 25/002; A01M 25/004
See application file for complete search history.

(56) References Cited

U.S. PATENT DOCUMENTS

| | | | | |
|---|---|---|---|---|
| 1,352,067 A | * | 9/1920 | Keyser | A01M 25/004 43/131 |
| 1,471,954 A | * | 10/1923 | Greenway | A01M 25/004 43/131 |
| 1,579,512 A | * | 4/1926 | Bushong | A01M 25/004 43/131 |
| 1,645,715 A | * | 10/1927 | Northrup | A01M 1/14 43/115 |
| 2,028,217 A | * | 1/1936 | Huffman | A01M 9/00 102/370 |
| 2,896,362 A | * | 7/1959 | Wingate | A01M 25/004 43/131 |
| 3,304,646 A | * | 2/1967 | Staley | A01M 1/103 43/131 |
| 3,940,876 A | * | 3/1976 | Zaccaira | A01M 23/08 43/131 |
| 4,160,335 A | * | 7/1979 | Von Kohorn | B32B 1/02 43/131 |
| 4,208,829 A | * | 6/1980 | Manning | A01M 25/004 43/131 |
| 4,400,904 A | * | 8/1983 | Baker | A01M 25/004 119/52.4 |

(Continued)

FOREIGN PATENT DOCUMENTS

| | | | | |
|---|---|---|---|---|
| DE | 802772 C | * | 2/1951 | .......... A01M 25/004 |
| DE | 1295921 B | * | 5/1969 | .......... A01M 25/004 |

(Continued)

*Primary Examiner* — David J Parsley
*Assistant Examiner* — Morgan T Barlow
(74) *Attorney, Agent, or Firm* — Betsy Kingsbury Dowd, Esq.; BKDowd Law, P C.

(57) ABSTRACT

A device for enclosing treated material impregnated with a pesticide and/or parasiticide and adapted for access by rodents or other targeted small animals includes a shell forming an enclosure to contain the treated material. The shell includes at least one entrance opening for accessing the enclosed treated material. Each entrance opening has a width less than a maximum inner width of the shell. The device may be formed completely of biodegradable material.

19 Claims, 8 Drawing Sheets

(56) References Cited

U.S. PATENT DOCUMENTS

| | | | | | |
|---|---|---|---|---|---|
| 4,630,392 | A | * | 12/1986 | Ferraro | A01M 25/004 43/131 |
| 4,648,201 | A | * | 3/1987 | Sherman | A01M 25/004 43/131 |
| 4,662,104 | A | | 5/1987 | Mather et al. | |
| 4,753,032 | A | * | 6/1988 | Sherman | A01M 25/004 43/131 |
| 4,835,902 | A | * | 6/1989 | Sherman | A01M 25/004 43/131 |
| 5,027,548 | A | * | 7/1991 | Anderson | A01M 25/002 43/131 |
| 5,275,125 | A | * | 1/1994 | Rotramel | A01K 67/033 119/416 |
| 5,359,807 | A | * | 11/1994 | Jackson | A01M 1/2016 43/131 |
| 5,966,863 | A | * | 10/1999 | Payton | A01M 1/2011 43/131 |
| 5,983,558 | A | * | 11/1999 | Las | A01M 1/2005 43/131 |
| 6,910,300 | B1 | * | 6/2005 | Warren | A01M 25/004 43/131 |
| 7,076,914 | B1 | * | 7/2006 | Howse | A01M 1/02 43/124 |
| 7,879,348 | B2 | * | 2/2011 | Volby | A01N 25/34 424/405 |
| 8,702,459 | B2 | * | 4/2014 | Flockenhagen | E02B 3/00 441/1 |
| 2003/0138472 | A1 | * | 7/2003 | Yonker | A01M 25/002 424/410 |
| 2004/0168363 | A1 | * | 9/2004 | Baker | A01M 1/2055 43/1 |
| 2004/0200131 | A1 | * | 10/2004 | Middlebrook | A01M 1/2011 43/124 |
| 2005/0081427 | A1 | * | 4/2005 | Emanuel | A01M 25/004 43/124 |
| 2005/0132637 | A1 | * | 6/2005 | Deakins | A01M 25/004 43/131 |
| 2006/0207163 | A1 | * | 9/2006 | Frokopy | A01N 25/006 43/131 |
| 2011/0014257 | A1 | * | 1/2011 | Rama | A01N 25/10 424/409 |
| 2011/0247955 | A1 | * | 10/2011 | Vickery | A01M 25/004 206/524.1 |
| 2011/0258907 | A1 | * | 10/2011 | Endepols | A01M 25/004 43/131 |
| 2012/0297663 | A1 | * | 11/2012 | Middlebrook | A01M 25/004 43/131 |
| 2013/0091758 | A1 | * | 4/2013 | Hiley | A01N 25/006 43/132.1 |
| 2014/0059919 | A1 | * | 3/2014 | Pupello | A01M 25/004 43/131 |
| 2014/0360091 | A1 | * | 12/2014 | Bunker | F42B 12/50 43/58 |
| 2015/0366215 | A1 | * | 12/2015 | Probasco | A01K 51/00 424/416 |
| 2016/0205920 | A1 | * | 7/2016 | Messaros | A01M 25/002 |
| 2016/0242403 | A1 | * | 8/2016 | Gaugler | A01N 25/00 |
| 2017/0035043 | A1 | * | 2/2017 | Lewis | A01M 25/004 |
| 2018/0161529 | A1 | * | 6/2018 | Keener | A61M 15/0021 |
| 2019/0008131 | A1 | * | 1/2019 | Austin | A01M 1/026 |
| 2019/0124912 | A1 | * | 5/2019 | Talbot | A01M 23/20 |

FOREIGN PATENT DOCUMENTS

| | | | | |
|---|---|---|---|---|
| DE | 3537805 C1 | * | 2/1987 | A01M 25/004 |
| DE | 4134678 A1 | * | 10/1992 | A01M 25/004 |
| FR | 1402847 A | * | 6/1965 | A01M 25/004 |
| FR | 1566332 A | * | 5/1969 | A01M 25/004 |
| FR | 2680950 A1 | * | 3/1993 | A01M 25/004 |
| GB | 153243 A | * | 11/1920 | A01M 25/002 |
| WO | WO-2012026703 A2 | * | 3/2012 | A01M 1/02 |
| WO | WO-2020191450 A1 | * | 10/2020 | A01M 25/002 |

* cited by examiner

DEVICE FOR DISPENSING PESTICIDES AND/OR PARASITICIDES TO RODENTS OR OTHER ANIMALS

CROSS-REFERENCE TO RELATED APPLICATIONS

This application claims the benefit of, and priority to, each of U.S. Provisional Application Ser. No. 62/666,739, entitled DEVICE FOR DISPENSING ECTOPARASITICIDES TO RODENTS, filed May 4, 2018, and U.S. Provisional Application Ser. No. 62/701,113, entitled DEVICE FOR DISPENSING PESTICIDES AND/OR PARASITICIDES TO RODENTS OR OTHER ANIMALS, filed Jul. 20, 2018, the entirety of each of which is hereby incorporated herein by reference thereto.

FIELD OF DISCLOSURE

The present disclosure relates generally to devices for dispensing pesticides, including insecticides and parasiticides, to animals and, in particular, to biodegradable enclosures for housing pesticide-treated, including parasiticide-treated, material for removal by rodents, or birds, or other animals.

BACKGROUND

Products are known that attempt to solve the problem of eradication of ticks using rodents as vectors for carrying ectoparasiticide-impregnated material into their nests. Ectoparasites carried by the rodents as well as those living in the nest are exposed to and killed by the ectoparasiticide, without harm to the rodent.

There are also other uses for treated cotton dispensers. For example, researchers have suggested using birds as vectors, making cotton treated with pesticides such as permethrin available to birds such as the wild finishes of the Galapagos Islands. The birds bring the treated cotton back to their nest, which contains sufficient pesticide to kill the parasitic fly maggots that feed on and kill baby birds, without harming the birds themselves.

U.S. Pat. No. 4,662,104 to Mather, et al. discloses an open-tubed device for housing ectoparasiticide-impregnated cotton. While rodents can easily access both sides of the tube, the open-ended design undesirably allows the consumer to come into contact with the insecticide, and the material to easily fall out and litter the surroundings. In addition, the tube is made of wax-coated cardboard or PVC and thus must be disposed of once it is empty and after it has been visited by rodents.

There is a need, therefore, for a more encapsulated design that prevents the treated cotton from falling out and eliminates the chance that the consumer will come into contact with the treated cotton, and that incorporates environmentally-friendly materials to eliminate the need to handle the device once it is emptied. There is also a need for a device for dispensing pesticides, such as parasiticides and ectoparasiticides, to rodents or other animals, and that is in a convenient form for placing in difficult to reach areas in which the rodents abound, such as sewers.

SUMMARY

Features of the disclosure will become apparent from the following detailed description considered in conjunction with the accompanying drawings. It is to be understood, however, that the drawings are designed as an illustration only and not as a definition of the limits of this disclosure.

The present disclosure is directed to a device for enclosing treated material impregnated with a pesticide and adapted for access by rodents or other small targeted animals. The device includes a shell forming an enclosure to contain treated material therein. The treated material includes a fibrous material impregnated with the pesticide, wherein the pesticide may include a parasiticide. The shell includes at least one entrance opening to allow rodents or other small targeted animals to access the treated material in the enclosure. Each of the entrance openings has a width less than a maximum inner width of the shell, which is preferably formed of a biodegradable material.

Embodiments of the device can include one or more of the following features and/or aspects of other aspects.

The shell of the device, in embodiments, may be substantially spherical in shape.

Embodiments of the device may further include a raised rib on an outer wall of the shell. The raised rib may be positioned parallel to one of the entrance openings, and in aspects, at least partially encircles the shell in a plane parallel to the one of the at least one entrance opening(s).

In embodiments, the at least one entrance opening is two entrance openings located at opposing poles of the shell, the plane of the raised rib being parallel to both of the two entrance openings.

In aspects of any of the embodiments, the pesticide may be an ectoparasiticide.

In other aspects of any of the embodiments, the pesticide may include at least one of an insecticide, insect repellant, and a pyrethrin.

In additional aspects of any of the embodiments, the biodegradable material may be formed of corrugated cardboard and/or recycled molded pulp.

Embodiments of the device may include a flap movably attached to an outer surface of the shell. The flap is movably positioned over and covers the at least one entrance opening for retaining the treated material therein, and is movable by a user for uncovering the at least one entrance opening for use of the device, allowing the treated material contained therein to be accessed by the rodents or other targeted small animals.

In further embodiments, the device further includes a living hinge hingedly connecting one end of the flap to the shell.

The present disclosure is also directed to a device for enclosing treated material impregnated with a pesticide and adapted for access by targeted small animals, the device including: a shell that is substantially spherical in shape, the shell forming an enclosure containing the treated material therein, the treated material including fibrous material impregnated with the pesticide; at least one entrance opening configured to allow the targeted small animals to access the treated material; and a flap movably attached to an outer surface of the shell, the flap movably positioned over and covering the at least one entrance opening for retaining the treated material therein. The flap is movable by a user for uncovering the at least one entrance opening for use of the device. The device, including the shell and the flap, is formed of a biodegradable material.

In embodiments, the device further includes a living hinge hingedly connecting one end of the flap to the shell. The living hinge may include a tear line for removing the flap from the shell for use.

In embodiments, the device includes a raised rib on an outer wall of the shell and positioned parallel to one of the at least one entrance opening. The raised rib at least partially encircles the shell in a plane parallel to the one of the at least one entrance opening.

The at least one entrance opening, in embodiments of the device, is two entrance openings located at opposing poles of the shell, and the plane of the raised rib is parallel to both of the two entrance openings.

The present disclosure is also directed to a system for storing and dispensing treated material impregnated with a pesticide to rodents or other targeted small animals. The system includes a storage tray, the storage tray including at least one pair of parallel rails and a plurality of recesses having a rounded shape aligned between the at least one pair; and a dispensing device retained in one of the plurality of recesses for storage, the dispensing device including the treated material therein.

The dispensing device, in embodiments of the system, includes a shell that is substantially spherical in shape forming an enclosure to contain the treated material therein. The treated material includes a fibrous material impregnated with the pesticide. The shell includes at least one entrance opening to allow targeted small animals, such as rodents, to access the treated material in the enclosure during use, each of the at least one entrance opening having a width less than a maximum inner width of the shell. The at least one entrance opening of the dispensing device stored in the storage tray is aligned parallel to and adjacent one of the parallel rails of the at least one pair.

In embodiments, the storage tray retains a dispensing device in each of the plurality of recesses, the storage tray being used for storing and transporting the dispensing devices until one or more of the dispensing devices is removed from the storage tray for use.

In embodiments, the at least one entrance opening of the dispensing device is two entrance openings located at opposing poles of the shell, each of the two entrance openings aligned parallel to and adjacent one of the parallel rails of the at least one pair of parallel rails of the storage tray.

The dispensing device retained in the storage tray, in embodiments, further includes a raised rib on an outer wall of the shell positioned parallel to the at least one entrance opening, the raised rib at least partially encircling the shell in a plane parallel to the at least one entrance opening. Each of the plurality of recesses includes a groove aligned parallel to the at least one pair of parallel rails, wherein the raised rib of the dispensing device is seated for storage in the storage tray in the groove of the one of the plurality of recesses.

The pesticide of the dispensing device may include one or more of an ectoparasiticide, insecticide, insect repellant, and a pyrethrin.

The shell of the dispensing device retained in the storage device may be formed of a biodegradable material.

The dispensing device retained in the storage tray, in embodiments, further includes a flap movably attached to an outer surface of the shell, the flap movably positioned over and covering the at least one entrance opening for retaining the treated material therein. The flap is movable by a user for uncovering the at least one entrance opening for use of the dispensing device, once removed from the storage tray.

The dispensing device retained in the storage tray may, in embodiments, further include a living hinge hingedly connecting one end of the flap to the shell.

Other features and advantages will become apparent from the following description of the preferred embodiments, taken in conjunction with the accompanying drawings.

BRIEF DESCRIPTION OF THE DRAWINGS

The drawings constitute a part of this disclosure and include examples, which may be implemented in various forms. It is to be understood that in some instances, various aspects of the disclosure may be shown exaggerated or enlarged to facilitate understanding. The teaching of the disclosure can be readily understood by considering the detailed description in conjunction with the accompanying drawings, which are briefly described below.

Figure 1A:
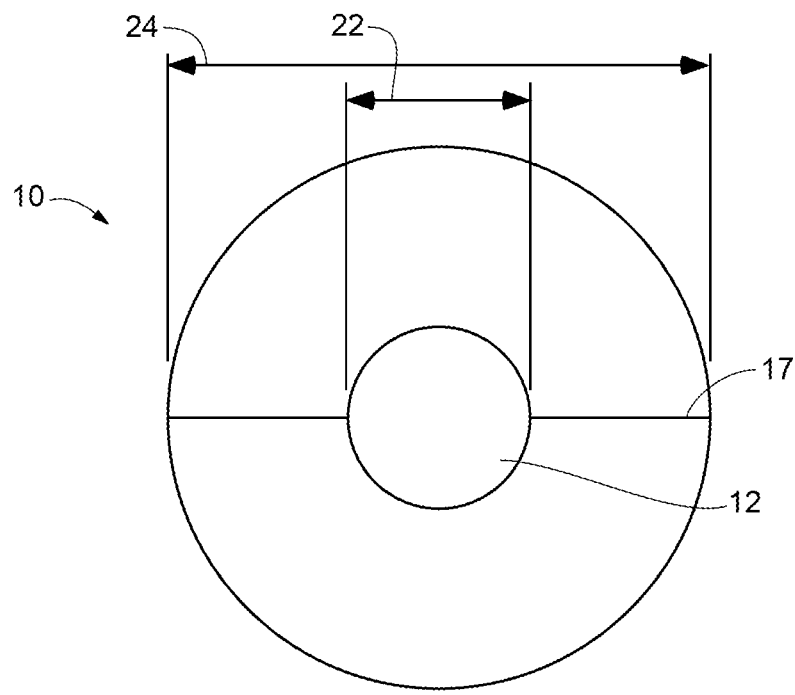
FIG. 1A is a pictorial representation of the front of an embodiment of a device of the present disclosure for dispensing pesticides, such as parasiticides and ectoparasiticides, to rodents or other animals.

The various aspects of the present disclosure mentioned above are described in further detail with reference to the aforementioned figures and the following detailed description of exemplary embodiments.

DETAILED DESCRIPTION

Particular illustrative embodiments of the present disclosure are described hereinbelow with reference to the accompanying drawings; however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements which may perform the same, similar, or equivalent functions. The word "exemplary" is used herein to mean "serving as an example, instance, or illustration." Any embodiment described herein as "exemplary" is not necessarily to be construed as preferred or advantageous over other embodiments. The word "example" may be used interchangeably with the term "exemplary."

The present disclosure is directed to devices for dispensing pesticides, such as insecticides and parasiticides, including ectoparasiticides, to rodents or other animals.

While the embodiments described in the specification and shown in the drawings are primarily directed to a particular example of a dispenser device holding ectoparasiticide-treated cotton intended for dispensing to rodents, mainly mice, for killing ticks, one of skill in the art will appreciate that the device of the disclosure can be used to dispense cotton or other fibrous media treated with any desired pesticide, including insecticides and parasiticides, for dispensing to any targeted small animal. As an example, embodiments of the device may contain pesticide-treated (permethrin) cotton for dispensing to birds. Many more examples are contemplated to be within the scope of this disclosure, which is not limited to those specific examples cited herein.

It is also noted that the cotton or other suitable material may be treated with any type of pesticide, including insecticide, and/or parasiticide. Some embodiments provided herein use a particular type of parasiticide known as an ectoparasiticide. As one of skill in the art will appreciate, the term "pesticide" includes substances for destroying insects, i.e., insecticides, as well as substances, including parasiticides, for destroying any other organism harmful to plants and/or animals. The term parasiticide refers to substances that kill any type of parasites, and includes ectoparasiticides.

Although it is understood that certain pesticides are also parasiticides, both the term "pesticide" alone and the phrase "pesticide and/or parasiticide" may be used herein to refer to any substance that kills any pest, insect or other, and/or parasite. The terms "treated" and "chemically treated" material refer to impregnation or soaking of the material with a substance that is a pesticide, wherein the pesticide may be or may include a parasiticide. One will appreciate that the scope of the disclosure is not limited to one particular chemical with which the fibrous material within the dispenser may be impregnated.

The term "pole" is used herein, to refer to one of two opposing locations on a surface of a sphere, an axis of the sphere intersecting the surface at the two poles.

The term "substantially" is used in reference to shapes, e.g., "substantially spherical" to encompass shapes including spheres that have one or more flattened ends, due to the openings in the embodiments herein, and also to include slight imperfections and/or texturing in surfaces, both intentional and as a result of processes, that may cause a deviation from a geometrically "perfect" shape such as a sphere.

The devices encompass a more encapsulated design for enclosing pesticide-impregnated material, for example, ectoparasiticide-impregnated cotton, for targeted small animals, e.g., rodents or birds to retrieve and carry back to their nests. The devices are constructed as an enclosure having at least one opening, and in some embodiments, only one opening, to prevent the treated cotton from falling out and to decrease the chance that the consumer will come into contact with the treated cotton. The devices of the disclosure are also preferably configured with a rounded shape to roll, and are in a convenient form for placing in difficult to reach areas in which rodents abound, such as sewers. The devices of the present disclosure also preferably incorporate environmentally-friendly materials to eliminate the need to handle the device once it is emptied.

The figures show embodiments of a device of the present disclosure for dispensing a chemically treated fibrous material to animals. The fibrous material is preferably suitable for nesting material for the animal. In embodiments, the fibrous material includes cotton balls.

The chemical with which the chemically treated fibrous material is impregnated may include a pesticide, which may be or may include a parasiticide.

In embodiments, the chemical includes ectoparasiticides, preferably in a form suitable to kill ticks. The device encloses the chemically treated fibrous material, such as ectoparasiticide-impregnated cotton, and is configured with at least one opening through which the targeted small animal, such as a rodent, may access and retrieve the cotton.

As shown in the embodiments, the device of the present disclosure may be in the shape of a ball or sphere.

In other embodiments, the device can have a rounded shape, and may be variations of a sphere, such as egg-shaped or closed cylinder, and preferably any other rounded shape that can roll. However, other shapes are also contemplated to be within the scope of embodiments of the disclosure.

Figure 1B:
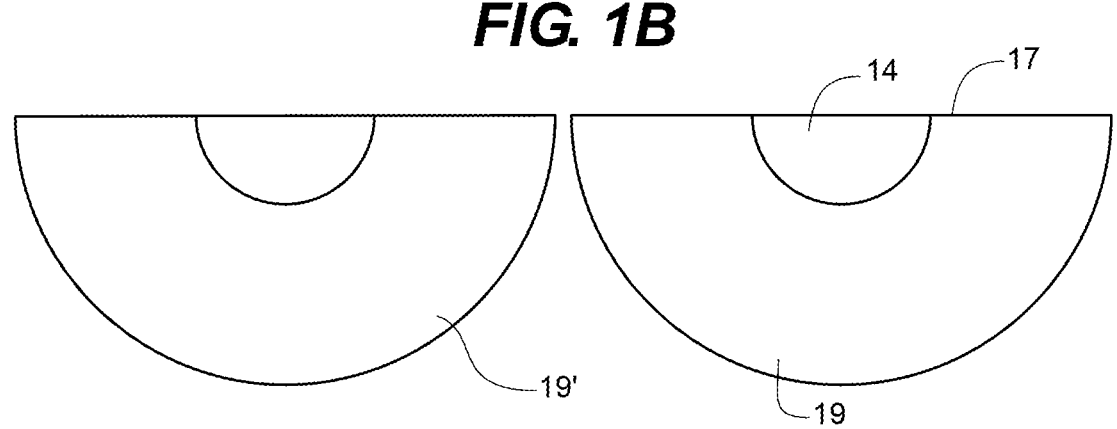
FIG. 1B is pictorial representation of the device of FIG. 1A before being closed and assembled as shown in FIG. 1A.
Figure 2A:
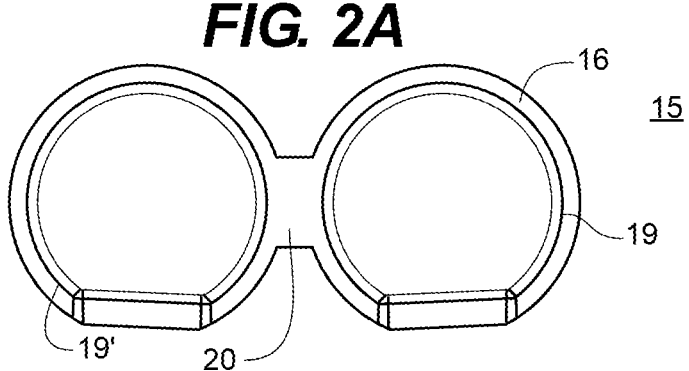
FIG. 2A is a pictorial representation of a top view of another embodiment of the device of the present disclosure for dispensing pesticides prior to being assembled and closed for use.
Figure 2B:
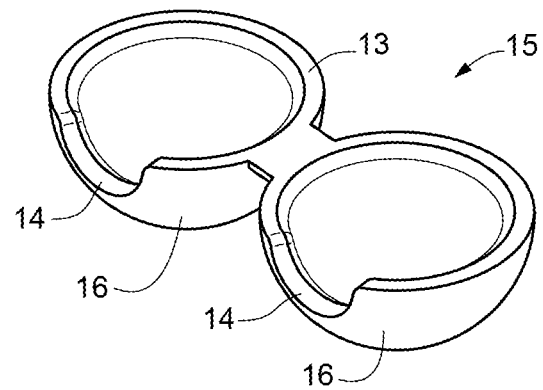
FIG. 2B is a perspective view of the device of FIG. 2A before being fully assembled and closed.
Figure 2C:
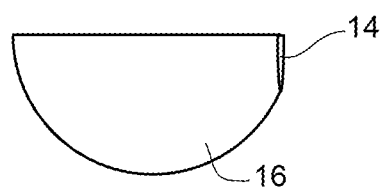
FIG. 2C is a side view of the open device of FIG. 2A.
Figure 2D:
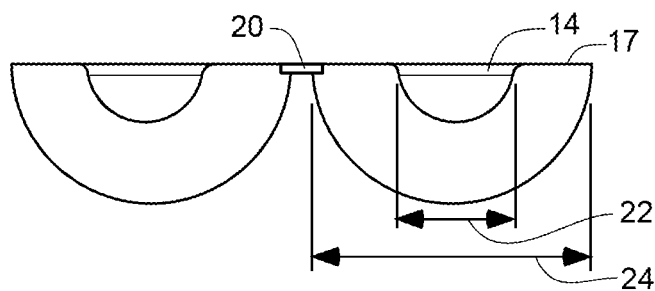
FIG. 2D is a front view of the unassembled device shown in FIGS. 2A-2D.

The device of the present invention, as shown for an embodiment 10 of FIGS. 1A and 1B, and for an embodiment 15 of the device shown in FIGS. 2A-2D, may have only one entrance opening 12 in an appropriate shape and size for providing rodents or other targeted small animals, such as birds, access to its contents. As shown in FIGS. 3A-7, embodiments 30 of the device may have two openings 12. In the embodiments shown, the device of the present disclosure has at least one opening. In yet additional embodiments, the device may have more than two openings.

Referring to FIG. 1A, the entrance opening 12 in embodiments may have an opening diameter 22 that is equal to or less than half of an outer diameter 24 of the device 10 to insure good confinement of the treated material, e.g., treated cotton, within the device 10. As shown in the figures, the entrance opening 12 may be circular.

In embodiments, as exemplified by device 10 in FIGS. 1A and 1B, for assembly of the device with treated material 60 (see FIG. 7), the device 10 may be manufactured in two halves, 19, 19', so that the device can be filled with the treated material and then closed and glued, heat-sealed, or otherwise permanently and fixedly joined and closed along a seam 17. In embodiments, as shown in FIGS. 1A and 1B, the two halves 19, 19' may be manufactured as separate pieces.

In embodiments exemplified by device 15 in FIGS. 2A-2D, for assembly of the device 15 with treated material 60 (see FIG. 7), the device 15 may be manufactured in one body formed with a living hinge 20 connecting a first half 19 to a second half 19'. After the first half 19 of the device is filled with the treated material, the second half 19' can be hingedly rotated around the living hinge 20 to close the device 15 with the treated material enclosed therein. The device 15 may be sealed shut by gluing, heat-sealing, or otherwise permanently and fixedly joining the halves 19, 19' along the seam 17, for example, along a perimetral rim 13 of each half (see FIGS. 2A and 2B). In embodiments, referring to FIGS. 1A-2D, the seam 17 for assembly may cut through the center of the entrance opening 12, each opened half including a semi-circular opening 14 for forming the entrance opening 12.

Upon assembly, as shown in the embodiments, the device is formed of an encapsulating shell 16. The materials used to form the shell 16 are preferably biodegradable. In embodiments, the material includes recycled molded pulp or variations thereof.

In embodiments, the material includes corrugated cardboard.

Figure 5:
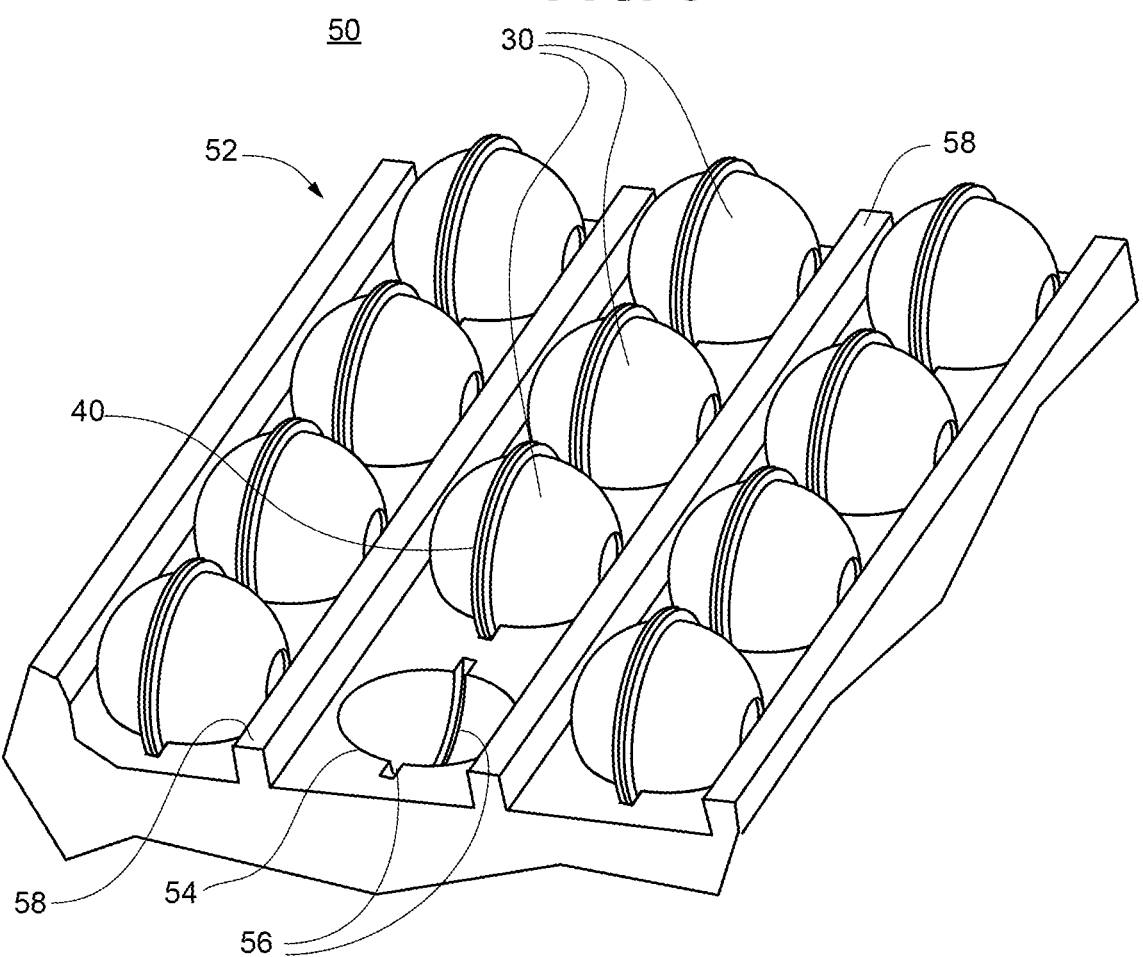
FIG. 5 is a pictorial representation of a perspective side view of an embodiment of a storage tray for holding a plurality of any embodiment of the devices of the present disclosure, for example, the devices shown in FIG. 3A.
Figure 6:
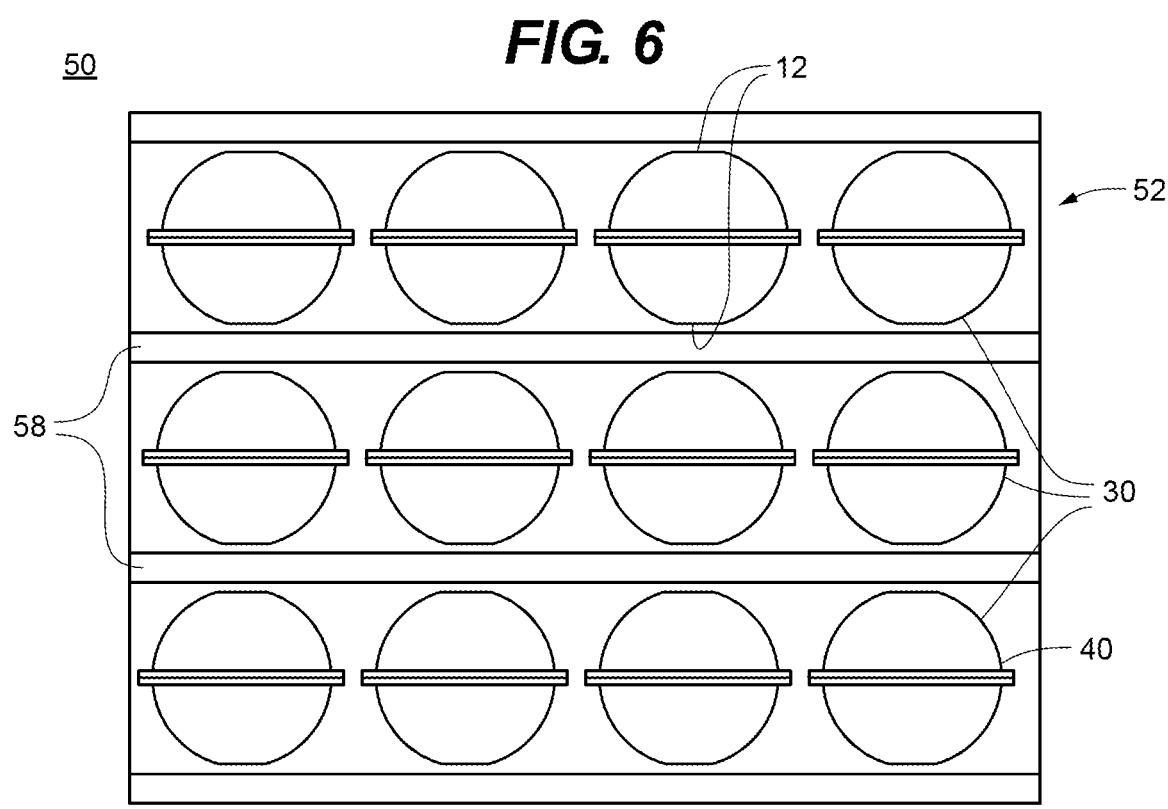
FIG. 6 is a pictorial representation of a top view of the storage tray of FIG. 5 filled with a plurality of fully assembled devices of the present disclosure.
Figure 7:
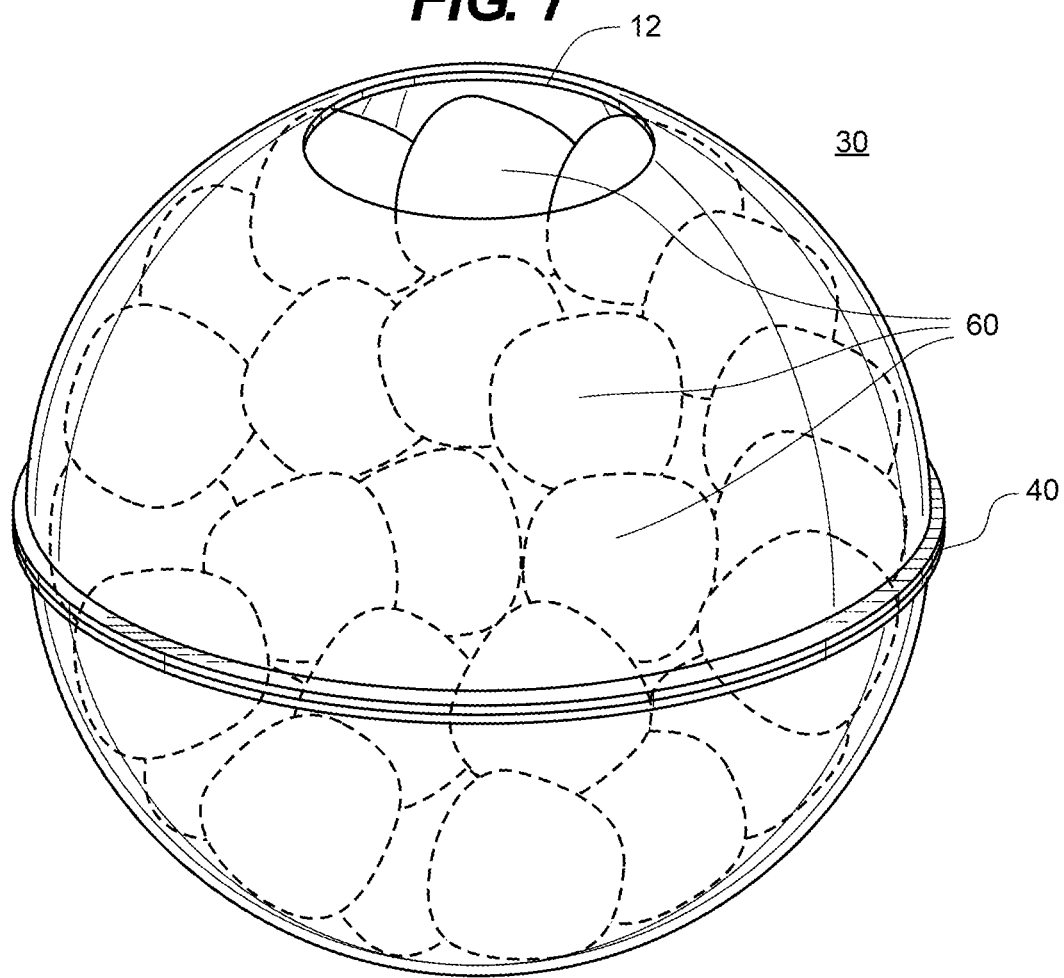
FIG. 7 is a pictorial 3-D representation of the device of FIG. 3A assembled with treated material.

Referring, for example, to the embodiment 30 of the device of FIGS. 3A-FIG. 7, any appropriate treated material 60 may be contained, upon assembly, within the encapsulating shell 16, as best shown in FIG. 7. Accordingly, the disclosure is directed both to embodiments of the device for assembling with treated material 60 (see FIG. 7), and to any embodiments of the devices fully assembled with treated materials 60 therein, as exemplified in FIG. 7 for device 30. Accordingly, embodiments of a fully assembled dispensing device of the disclosure may include any embodiments of the device of the present disclosure, including the shell 16 and at least one entrance opening 12, with any suitable treated material 60 enclosed therein.

In one embodiment, the contents, or treated material 60 may include an ectoparasiticide-impregnated material, such as ectoparasiticide-impregnated cotton. Preferably, organic raw cotton is the material used. In embodiments, cotton, preferably organic raw cotton, is impregnated with a solution that includes an insecticide, insect repellant, and/or a pyrethrin. The treated cotton 60 is then completely enclosed within the device, which is preferably substantially spherical in shape. These pesticides are commonly used in flea and tick control on pets. Other types of materials, and other types of pesticides, such as, but not limited to, insecticides and parasiticides, may also be used without departing from the scope of the disclosure.

In embodiments, either the treated contents 60 or an interior surface of the shell 16 (or both) also include an attractant for mice or other animals, as desired.

As shown in FIGS. 1A-2D, embodiments of the device may include only one entrance opening 12, which serves as the access port 12, for the mouse or other animal. In embodiments, the entrance opening 12 is a circular hole. The radius of the entrance opening 12 in embodiments may be ⅝ inches (entrance opening 12 has a diameter 22—or width 22 if the entrance opening 12 is not circular—of 1.25 inches), and the outer radius of the shell 16 of the device 10 is about 1.5 inches (diameter 24—or width 24—is 3 inches). In embodiments, a thickness of the shell 16 is about ⅛ inch or less, so that the overall inner diameter of the device is no less than about 2¾ inches.

In other embodiments, the diameter or width 24 of the entrance opening 12 is about 1 inch.

In embodiments, the entrance opening, also referred to herein as access port 12, may be of any suitable dimension, and may range, for example, from between about 1 to 1.50 inches for a dispenser having a diameter or width 24 of 3 inches, preferably keeping a width/diameter 22 of the access port 12 as small as possible so that the contents of the device 15, for example, of FIGS. 2A-2D do not spill out and litter the surroundings.

In embodiments, as shown in FIGS. 3A-7, two entrance openings 12 may be provided as access ports 12 for the targeted small animals, such as mice or rodents. It is also contemplated that embodiments may include more than two entrance openings 12. The size/diameter of the device, i.e., of the outer shell 16 is preferably appropriately dimensioned to accommodate the additional openings 12 so that the treated contents can be effectively contained within the shell 16. For example, for embodiments 10, 15 of the device shown in FIGS. 1A-2D having one entrance opening and in embodiments 30 of the device shown in FIGS. 3A-7 having two entrance openings 12, the sizes of the entrance opening (s) 12 may range from about 1 to 1.5 inches, and a diameter of the outer shell 16 is preferably at least twice the size of one of the entrance opening(s) 12.

In other embodiments, the outer diameter 24 of the device 10 is in a range of between about 2.5 to 3.5 inches, preferably about 3 inches.

Figure 3A:
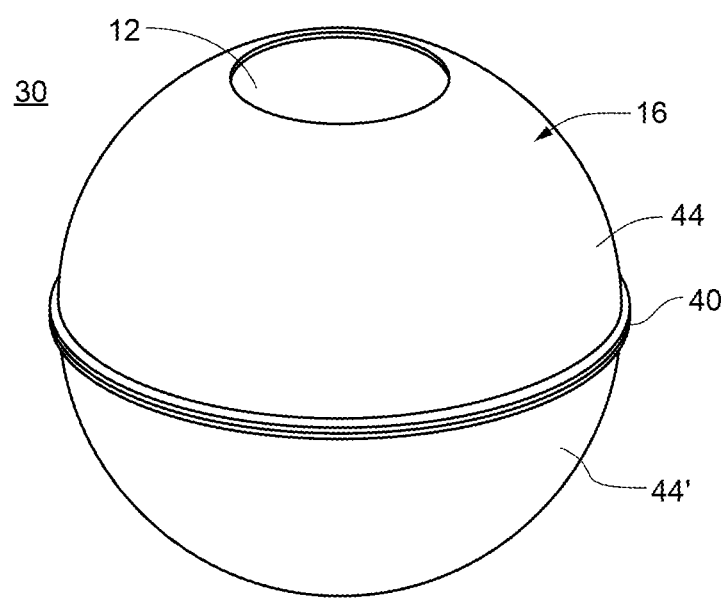
FIG. 3A is a pictorial representation of a perspective top side view of another embodiment of a device for dispensing pesticides, e.g., parasiticides and ectoparasiticides, to rodents or other animals of the present disclosure.
Figure 3B:
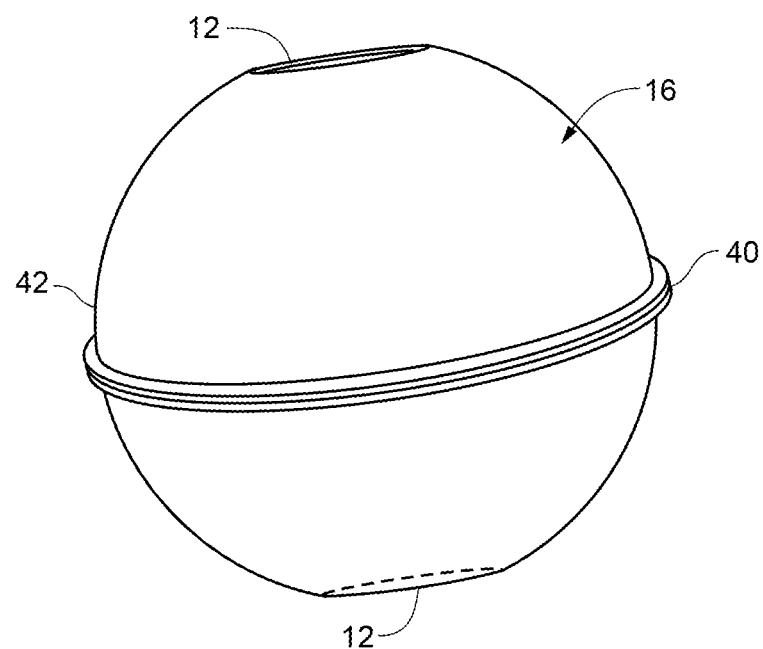
FIG. 3B is a pictorial representation of a perspective side view of the device of FIG. 3B.
Figure 3C:
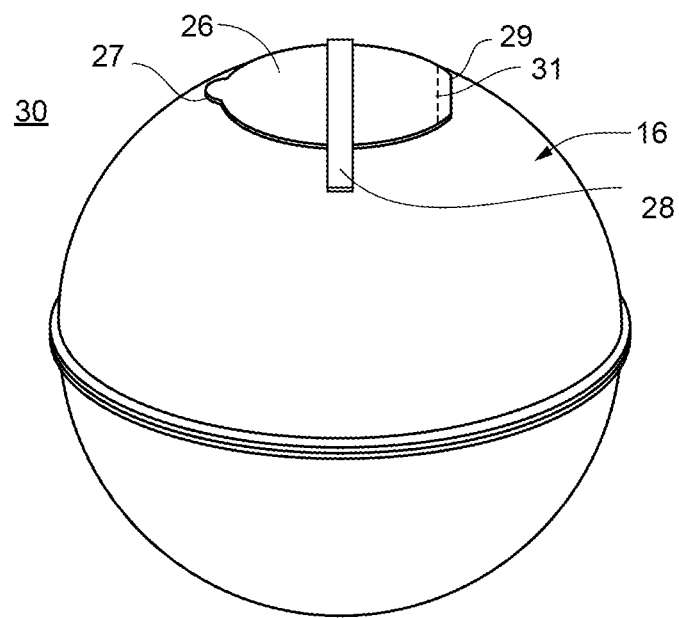
FIG. 3C is a pictorial representation of another embodiment of the device of the present disclosure.

Referring, for example, to FIG. 3C, in further embodiments, any device of the present disclosure, also referred to herein as a dispensing device when fully assembled with treated cotton or other material 60 as shown in FIG. 7, may also include a movable flap 26 positioned to cover an entrance opening 12. In embodiments of the device having more than one entrance opening 12, each entrance opening 12 may be covered by a separate movable flap 26.

The movable flap 26 is configured to prevent spillage of the treated material 60 through the entrance opening 12 it covers. By covering each entrance opening 12 with a movable flap, all pesticides may be completely contained inside the shell 16 until the dispensing device 30, for example, is put into use. The flap(s) 26 also adds extra protection to a user from contact with the treated contents 60 while the dispensing device 30 is being transported to a location for use. The movable flap 26 of the disclosure is, in embodiments, disposable and biodegradable. In some embodiments, the movable flap 26 may be completely removed for use of the dispensing device 30. In other embodiments, the movable flap 26 may be moved to uncover the entrance opening 12, but maintained on the dispensing device 30 when deployed for use.

In embodiments, the flap 26 may include a pull-tab 27 to easily uncover the entrance opening 12.

In embodiments, the flap 26 may be formed of the same biodegradable material as the shell 16, and may, in embodiments, include a small removable adhesive strip 28 that keeps it from popping up and/or off the shell 16 until moved, or removed, by a user.

In embodiments, the flap 26 includes a living hinge 29 integrally connected to, and formed of the same biodegradable materials as, the shell 16. Upon removal of the adhesive strip 28, and, in embodiments, upon pulling up on the tab 27, the flap 26 pops up to allow access to small animals. The flap 26, in embodiments, may stay attached to the device 30 along the living hinge 29. In other embodiments, the living hinge 29 includes a tear line 31, e.g., perforations, for easily pulling off and removing the flap 26 along the tear line.

In use, the flap 26 is moved, and in embodiments, removed, from blocking the entrance opening 12 of the device 30, or in embodiments of the device 30 as shown having two openings 12, each flap 26 is moved or removed from blocking each of the two entrance openings 12, before putting the dispensing device 30 in a place where the targeted small animals, e.g., mice, used as the vectors for delivery of the pesticide are living. Depending on the type of flap 26 used, it is either completely removed as described above, or allowed to pop-up in a hinge-like fashion, remaining attached to the shell 16, to uncover the entrance opening 12.

Because of the unique design of the device of the invention including the shell 16 and other features, when fully assembled with the treated material 60 therein, embodiments of the dispensing device 30, for example, can easily be thrown and can roll into otherwise hard to reach places. In embodiments, the flap 26, e.g., a pop-up flap, if left on the dispensing device 30 before throwing it, may be further configured to pop-up and/or become partially or completely detached upon impact, offering still additional advantageous protection from contact with, and spillage of, the treated contents.

Once positioned with the entrance opening(s) 12 unblocked, animals used as vectors to deliver the treated material 60, e.g., rodents such as mice or rats, or birds, may find the dispensing device containing the treated contents 60 (see FIG. 7), and retrieve and bring the treated fibrous material 60 back to their nests. The pesticide and/or parasiticide on the treated material 60, cotton, for example, will act to kill pests, such as ticks, fleas, flies, and so on that are carried by the animals and/or that are present in the nests. In some cases, the process may prevent the transmission of disease from animal to human.

Referring to FIGS. 3A-7, for example, embodiments 30 of the dispensing device 30 of the present invention for enclosing treated material impregnated with a pesticide, which may include a parasiticide, are adapted for access to rodents or other small animals. The device 30 includes the shell 16 forming an enclosure to contain the treated material therein, wherein the shell 16 includes at least two entrance openings 12 to allow rodents to access the treated material 60 in the enclosure. Each of the two entrance openings has a width 36 (see FIG. 4) less than a maximum inner width 38 (the inner diameter in the embodiments shown, see FIG. 4), and, in further embodiments, less than half of the maximum inner width 38, of the shell 16.

The embodiments shown in FIGS. 3A-7 are spherical, or substantially spherical in shape, having two openings 12 located at opposing poles of the spherical shell 16. As shown, for example, in FIGS. 3A-3C, embodiments of the device may also include a raised rib 40 on an outer surface 42 of the shell 16 and positioned between two entrance openings 12, with the raised rib 40 at least partially encircling the shell 16 in a plane parallel to at least one of the at least two entrance openings 12.

In the embodiment shown, wherein the shell 16 is substantially spherical and has two openings at opposing poles, the raised rib 40 may, in embodiments, be aligned to partially, or in embodiments, to fully, encircle the circumference of the shell 16, as shown.*

Figure 4:
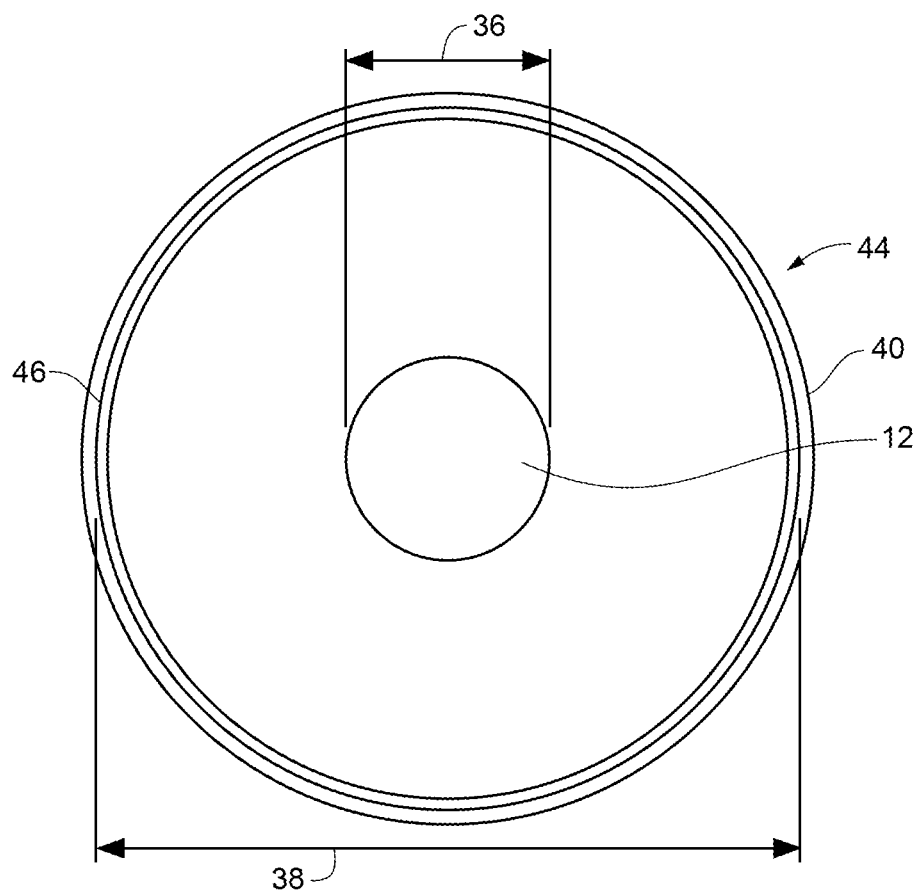
FIG. 4 is a pictorial representation of an interior of an unassembled half of the device of FIG. 3A.

Referring also to FIG. 4, in further embodiments, the device 30 may be formed in two halves 44, 44' (see FIG. 3A) prior to assembly. One of the halves 44 prior to assembly is shown in FIG. 4, in which the width, e.g., diameter 36 of the entrance opening 12 is clearly seen to be less than half of the maximum inner width 38, e.g., inner diameter 38 of the device, so that the treated material 60 (see FIG. 7) will not fall out of the assembled device 30. In embodiments, the one half 44 is fixedly attached, e.g., via adhesives, heat sealing, or other appropriate means, to its other half 44' at rimmed peripheral surfaces 46, with the treated material enclosed. Once assembled with the treated material 60 enclosed therein (see FIG. 7), the rimmed peripheral surfaces 46 are joined.

In embodiments, the rimmed peripheral surfaces 46 are wider than the thickness of the shell 16, and protrude outward from the outer surface 42 of the shell wall 16 to form the raised rib 40.

The entrance openings 12, while shown as circles, may be of any suitable shape, including without limitation, elliptical or rectangular.

Referring to FIGS. 5 and 6, the present disclosure is also directed to a system 50 (also referred to as a kit) for storing and dispensing treated material to targeted small animals. The system 50 includes a storage tray 52 including a plurality of recesses 54, each recess, in embodiments, having a shape, in embodiments, a rounded shape, configured to seat and retain the fully assembled (with the treated material) devices 30 therein. The kit 50 additionally includes a plurality of the assembled devices 30, each device 30 being positioned in one of the recesses. Each recess 54 is preferably shaped to seat the device 30 therein, and also includes, in embodiments, an aligning element, which may be a groove 56, in embodiments, positioned and configured to seat a protruding element of the assembled device 30, in embodiments, the raised rib 40, therein. The tray 52, in embodiments, further includes at least one pair of rails 58, positioned parallel to each other. When the device 30 is properly seated in one of the recesses 54, with the protruding element, for example, the raised rib 40, in embodiments, positioned in the aligning element, for example, the groove 56, each of the entrance openings 12 is adjacent, and parallel to, one of the rails 58. Use of the tray 52 to transport and store the devices 30 helps to keep the treated material 60 (see FIG. 7) contained within the devices 30 and helps to confine any treated material 60 that may fall out of the devices to the tray 52.

Embodiments of the system 50 may include embodiments of any of the dispensing devices 10, 15, 30 shown, each of which may also include the flap(s) 26 movably positioned over each of the entrance openings 12 for storing and transporting the dispensing devices in the tray 52.

While the invention has been particularly shown and described with reference to specific embodiments, it should be apparent to those skilled in the art that the foregoing is illustrative only and not limiting, having been presented by way of example only. Various changes in form and detail may be made therein without departing from the spirit and scope of the invention. Therefore, numerous other embodiments are contemplated as falling within the scope of the present invention as defined by the accompanying claims and equivalents thereto.

What is claimed is:

1. A device for enclosing treated material impregnated with a pesticide and adapted for access by mice or other rodents, the device comprising:
   a shell in the shape of a sphere having an inner diameter, the shell forming an enclosure containing the treated material therein, the treated material comprising a fibrous material formed into balls and impregnated with the pesticide, the treated material filling and enclosed within the shell and configured for removal in use by mice or other rodents, wherein the pesticide includes a parasiticide; and
   wherein the shell includes at least one entrance opening to the enclosure configured to allow mice or other rodents to access and remove the treated material via the at least one entrance opening in use, each of the at least one entrance opening having a width less than the inner diameter of the sphere defining the shape of the shell; and
   wherein the shell is formed of a biodegradable material.

2. The device of claim 1, wherein the width of the at least one entrance opening is equal to or less than half the inner diameter of the shell.

3. The device of claim 1, the device further comprising a raised rib on and extending outwardly from an outer wall of the shell and positioned parallel to one of the at least one entrance opening, the raised rib at least partially encircling the shell in a plane parallel to the one of the at least one entrance opening.

4. The device of claim 3, wherein the at least one entrance opening is two entrance openings located at opposing poles of the shell, and wherein the plane of the raised rib is parallel to both of the two entrance openings.

5. The device of claim 1, wherein the pesticide is an ectoparasiticide.

6. The device of claim 1, wherein the pesticide includes at least one of an insecticide, insect repellant, and a pyrethrin.

7. The device of claim 1, wherein the biodegradable material includes one of corrugated cardboard and recycled molded pulp, and wherein an interior surface of the shell includes an attractant for mice.

8. The device of claim 1, further comprising a flap movably attached to an outer surface of the shell, the flap movably positioned over and covering the at least one entrance opening for retaining the treated material therein, the flap being movable by a user for uncovering the at least one entrance opening for use of the device.

9. The device of claim 8, further comprising a living hinge hingedly connecting one end of the flap to the shell, the living hinge including a tear line for removing the flap from the shell for use.

10. The device of claim 1, wherein the at least one entrance opening is two entrance openings located at opposing poles of the shell, and wherein the fibrous material is cotton.

11. A device for enclosing treated material impregnated with a pesticide and adapted for access by targeted small animals, the device comprising:
- a shell that is substantially spherical in shape, the shell forming an enclosure containing the treated material therein, the treated material comprising fibrous material impregnated with the pesticide;
- at least one entrance opening configured to allow the targeted small animals to access the treated material; and
- a flap movably attached to an outer surface of the shell, the flap movably positioned over and covering the at least one entrance opening for retaining the treated material therein, the flap being movable by a user for uncovering the at least one entrance opening for use of the device,
- wherein the device, including the shell and the flap, is formed of a biodegradable material,
- the device further comprising a living hinge hingedly connecting one end of the flap to the shell, the living hinge including a tear line for removing the flap from the shell for use.

12. A system for storing and dispensing treated material impregnated with a pesticide to mice or other rodents, the system including:
- a storage tray, the storage tray including at least one pair of parallel rails and a plurality of recesses having a rounded shape aligned between the at least one pair; and
- a dispensing device retained in one of the plurality of recesses for storage, the dispensing device including the treated material therein, the dispensing device further including:
  - a shell in the shape of a sphere having an inner diameter, the shell forming an enclosure containing the treated material therein, the treated material comprising a fibrous material formed into balls and impregnated with the pesticide, the treated material filling and enclosed within the shell and configured for removal in use by mice or other rodents;
  - wherein the shell includes at least one entrance opening to the enclosure configured to allow mice or other rodents to access and remove the treated material via the at least one entrance opening during use, each of the at least one entrance opening having a width less than the inner diameter of the sphere defining the shape of the shell; and
- wherein the at least one entrance opening of the dispensing device stored in the storage tray is aligned parallel to and adjacent one of the parallel rails of the at least one pair.

13. The device of claim 12, wherein an interior surface of the shell of the dispensing device includes an attractant for mice.

14. The system of claim 12, wherein the at least one entrance opening of the dispensing device is two entrance openings located at opposing poles of the shell, each of the two entrance openings aligned parallel to and adjacent one of the parallel rails of the at least one pair of parallel rails of the storage tray.

15. The system of claim 12, wherein the dispensing device further includes a raised rib on and extending outwardly from an outer wall of the shell positioned parallel to the at least one entrance opening, the raised rib at least partially encircling the shell in a plane parallel to the at least one entrance opening, and wherein each of the plurality of recesses includes a groove aligned parallel to the at least one pair of parallel rails, wherein the raised rib of the dispensing device is seated for storage in the storage tray in the groove of the one of the plurality of recesses.

16. The system of claim 12, wherein the pesticide is one of an ectoparasiticide, insecticide, insect repellant, and a pyrethrin.

17. The system of claim 12, wherein the shell of the dispensing device is formed of a biodegradable material and wherein the fibrous material is cotton.

18. The system of claim 12, wherein the dispensing device further includes a flap movably attached to an outer surface of the shell, the flap movably positioned over and covering the at least one entrance opening for retaining the treated material therein, the flap being movable by a user for uncovering the at least one entrance opening for use of the dispensing device.

19. The system of claim 18, the dispensing device further including a living hinge hingedly connecting one end of the flap to the shell, the living hinge including a tear line for removing the flap from the shell for use.

* * * * *